(12) United States Patent
Orlovskaya et al.

(10) Patent No.: US 10,427,946 B2
(45) Date of Patent: Oct. 1, 2019

(54) MECHANOCHEMICAL SYNTHESIS OF IRIDIUM DIBORIDE AND IRIDIUM MONOBORIDE

(71) Applicants: University of Central Florida Research Foundation, Inc., Orlando, FL (US); UT-Battelle, LLC, Oak Ridge, TN (US)

(72) Inventors: Nina Orlovskaya, Orlando, FL (US); Richard Blair, Oviendo, FL (US); Zhilin Xie, Oviendo, FL (US); David A. Cullen, Oak Ridge, TN (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 32 days.

(21) Appl. No.: 15/522,702

(22) PCT Filed: Oct. 27, 2015

(86) PCT No.: PCT/US2015/057602
§ 371 (c)(1),
(2) Date: Apr. 27, 2017

(87) PCT Pub. No.: WO2016/069614
PCT Pub. Date: May 6, 2016

(65) Prior Publication Data
US 2017/0334731 A1 Nov. 23, 2017

Related U.S. Application Data

(60) Provisional application No. 62/069,299, filed on Oct. 27, 2014.

(51) Int. Cl.
| | | |
|---|---|---|
| *C01B 35/04* | (2006.01) | |
| *C22C 1/10* | (2006.01) | |
| *C22C 29/14* | (2006.01) | |

(52) U.S. Cl.
CPC ............ *C01B 35/04* (2013.01); *C22C 1/1084* (2013.01); *C22C 29/14* (2013.01)

(58) Field of Classification Search
CPC ........ C01B 35/04; C22C 29/14; C22C 1/1084
See application file for complete search history.

(56) References Cited

U.S. PATENT DOCUMENTS

2014/0199226 A1 7/2014 Orlovskaya et al.

OTHER PUBLICATIONS

Wang, et al., New Crystal Structures of IrB and IrB2: First-principles Calculations, Journal of Physical Chemistry C, 2012, vol. 116, pp. 21961-21966.
Zhao et al., Structural, Mechanical, and Electronic Properties of TaB2, TaB, IrB2, and IrB: First-principle Calculations, Journal of Solid State Chemistry, vol. 182, 2009, pp. 2880-2886.

(Continued)

*Primary Examiner* — Anthony J Zimmer
(74) *Attorney, Agent, or Firm* — Dunlap Codding, P.C.

(57) ABSTRACT

The present disclosure relates generally to a composition comprising at least one of iridium diboride and iridium monoboride, and methods of making such. The present disclosure also relates to a composition comprising iridium monoboride and at least one of (a) rows of single iridium atoms and/or (b) one or more clusters of iridium atoms, and methods of making such.

12 Claims, 13 Drawing Sheets

(56) References Cited

OTHER PUBLICATIONS

Aronsson, The Crystal Structure for RuB2, OsB2 and IrB1.35 and Some General Comments on the Crystal Chemistry of Borides in the Composition Range MeB-MeB3, Acta Chemica Scandinavia, vol. 17, 1963, pp. 2036-2050.

Rogl et al., New Complex Borides with ReB2- and Mo2IrB2-type Structure, Journal of Solid State Chemistry, vol. 24, 1978, pp. 175-181.

Xie, et al., In Search of the Elusive IrB2: Can Mechanochemistry Help?, Journal of Solid State Chemistry, Oct. 20, 2015 (online), vol. 233, pp. 108-119.

PCT/US2015/057602, International Search Report and Written Opinion dated Jan. 18, 2016.

PCT/US2015/057602, International Preliminary Report on Patentability dated May 2, 2017.

R. G. Munro, "Material Properties of Titanium Diboride," J. Res. Natl. Inst. Stand. Technol., vol. 105, pp. 709-720, 2000.

E. Eakins, D. Jayaseelan, and W. Lee, "Toward Oxidation-Resistant ZrB2—SiC Ultra High Temperature Ceramics," Metallurgical and Materials Transactions A, vol. 42, pp. 878-887, Apr. 1, 2011 2011.

J. K. Sonber and A. K. Suri, "Synthesis and consolidation of zirconium diboride: review," Advances in Applied Ceramics, vol. 110, pp. 321-334, 2011.

N. Orlovskaya, R. Stadelmann, M. Lugovy, V. Subbotin, G. Subhash, M. Neubert, et al., "Mechanical properties of ZrB2—SiC ceramic composites: room temperature instantaneous behaviour," Advances in Applied Ceramics, vol. 112, pp. 9-16, 2013.

M. Jalaly, M. Sh. Bafghi, M. Tamizifar, and F. J. Gotor, "Mechanosynthesis of nanocrystalline ZrB2-based powders by mechanically induced self-sustaining reaction method," Advances in Applied Ceramics, vol. 112, pp. 383-388, 2013.

B. Cristina and Y. Tsutomu, "Review of the superconducting properties of MgB 2," Superconductor Science and Technology, vol. 14, p. R115, 2001.

X. Fan, X. Xiao, L. Chen, J. Shao, L. Zhang, S. Li, et al., "Superior Catalytic Effects of Transition Metal Boride Nanoparticles on the Reversible Hydrogen Storage Properties of Li—Mg—B—H System," Particle & Particle Systems Characterization, vol. 31, pp. 195-200, 2014.

H.-Y. Chung, M. B. Weinberger, J. B. Levine, A. Kavner, J.-M. Yang, S. H. Tolbert, et al., "Synthesis of Ultra-Incompressible Superhard Rhenium Diboride at Ambient Pressure," Science, vol. 316, pp. 436-439, Apr. 20, 2007 2007.

R. W. Cumberland, M. B. Weinberger, J. J. Gilman, S. M. Clark, S. H. Tolbert, and R. B. Kaner, "Osmium Diboride, An Ultra-Incompressible, Hard Material," Journal of the American Chemical Society, vol. 127, pp. 7264-7265, May 1, 2005 2005.

H.-Y. Chung, J. M. Yang, S. H. Tolbert, and R. B. Kaner, "Anisotropic mechanical properties of ultra-incompressible, hard osmium diboride," Journal of Materials Research, vol. 23, pp. 1797-1801, 2008.

A. Knappschneider, C. Litterscheid, J. Kurzman, R. Seshadri, and B. Albert, "Crystal Structure Refinement and Bonding Patterns of CrB4: A Boron-Rich Boride with a Framework of Tetrahedrally Coordinated B Atoms," Inorganic Chemistry, vol. 50, pp. 10540-10542, Nov. 7, 2011 2011.

R. Mohammadi, A. T. Lech, M. Xie, B. E. Weaver, M. T. Yeung, S. H. Tolbert, et al., "Tungsten tetraboride, an inexpensive superhard material," Proceedings of the National Academy of Sciences, Jun. 20, 2011 2011.

Z. Xie, M. Lugovy, N. Orlovskaya, T. Graule, J. Kuebler, M. Mueller, et al., "Hexagonal OsB2: Sintering, microstructure and mechanical properties," Journal of Alloys and Compounds, vol. 634, pp. 168-178, Jun. 15, 2015.

B. Aronsson, E. Stenberg, and J. Aselius, "Borides of Rhenium and the Platinum Metals," Acta Chemica Scandinavica, vol. 14, 1960.

B. Aronsson, "The Crystal Structure of RuB2, OsB2, and IrB1.35 and Some General Comments on the Crystal Chemistry of Borides in the Composition Range MeB-MeB3," Acta Chemica Scandinavica, vol. 17, 1963.

B. Aronsson and S. Rundqvist, "Borides, Silicides and Phosphicles of the Platinum Metals," Platinum Metals Rev.,, vol. 5, pp. 93-95, 1961.

Z. Xie, A. C. Terracciano, D. A. Cullen, R. G. Blair, and N. Orlovskaya, "High Temperature Ir Segregation in Ir-B Ceramics: Effect of Oxygen Presence on Stability of IrB2 and Other Ir-B Phases," Advances in Applied Ceramics, p. 1743676115Y.0000000002, 2015.

G. F. Tavadze and A. S. Shteinberg, Production of advanced materials by methods of self-propagating high-temperature synthesis: Springer, 2013.

Z.-W. Ji, C.-H. Hu, D.-H. Wang, Y. Zhong, J. Yang, W.-Q. Zhang, et al., "Mechanical properties and chemical bonding of the Os—B system: A first-principles study," Acta Materialia, vol. 60, pp. 4208-4217, Jun. 2012.

N. Orlovskaya, Z. Xie, M. Klimov, H. Heinrich, D. Restrepo, R. Blair, et al., "Mechanochemical synthesis of ReB2 powder," Journal of Materials Research, vol. 26, pp. 2772-2779, 2011.

Z. Xie, M. Graule, N. Orlovskaya, E. Andrew Payzant, D. A. Cullen, and R. G. Blair, "Novel high pressure hexagonal OsB2 by mechanochemistry," Journal of Solid State Chemistry, vol. 215, pp. 16-21, Jul. 2014.

Z. Xie, R. Blair, N. Orlovskaya, and E. A. Payzant, "Hexagonal OsB2 reduction upon heating in H2 containing environment," Advances in Applied Ceramics, vol. In press, 2014.

Z. Xie, R. G. Blair, N. Orlovskaya, D. A. Cullen, and E. Andrew Payzant, "Thermal stability of hexagonal OsB2," Journal of Solid State Chemistry, vol. 219, pp. 210-219, Nov. 2014.

N. Orlovskaya, Z. Xie, and R. Blair, "Mechanochemical Synthesis of Hexagonal OsB2," U.S. Appl. No. 14/157,216, 2014.

C. Suryanarayana, "Mechanical alloying and milling," Progress in Materials Science, vol. 46, pp. 1-184, Jan. 2001.

J. J. Gilman, "Mechanochemistry," Science, vol. 274, p. 65, Oct. 4, 1996. p. 65.

V. I. Levitas,"Continuum mechanical fundamentals of mechanochemistry," in High Pressure Surface Science and Engineering, ed: Taylor & Francis, 2003, pp. 161-292.

C. T. Liu and H. Inouye, "Study of iridium and iridium-tungsten alloys for space radioisotopic heat sources. [Up to 4% W; fabrication; microstructure; tensile; oxidation; compatibility; fractures]," ORNL-5240; TRN: 77-005712 United States10.2172/7321970TRN: 77-005712Thu Jun. 28 09:03:31 EDT 2012Dep. NTISORNL; ERA-02-022798; EDB-77-043558English, 1976.

B. Aronsson, E. Stenberg, and J. Aselius, "Borides of Ruthenium, Osmium and Iridium," Nature, vol. 195, pp. 377-378, 1962.

Dragana Živković and L. Stuparevic, "Calculation of the thermodynamic properties in the Ir—B system based on the known phase diagram," RMZ-Materials and Geoenvironment, vol. 52, pp. 463-468, 2005.

H. F. Pang, Y. W. Ng, Y. Xia, and A. S. C. Cheung, "Electronic transitions of iridium monoboride," Chemical Physics Letters, vol. 501, pp. 257-262, Jan. 7, 2011.

H. Ipser and P. Rogl, "Constitution diagrams of the binary systems Pd—B and Ir—B," Journal of the Less Common Metals, vol. 82, p. 363, Nov. 1981.

P. Rogl, H. Nowotny, and F. Benesovsky, "Ein Beitrag zur Strukturchemie der Iridiumboride," Monatshefte für Chemie / Chemical Monthly, vol. 102, pp. 678-686, May 1, 1971 1971.

J. V. Rau and A. Latini, "New Hard and Superhard Materials: RhB1.1 and IrB1.35," Chemistry of Materials, vol. 21, pp. 1407-1409, Apr. 28, 2009 2009.

A. Latini, J. V. Rau, R. Teghil, A. Generosi, and V. R. Albertini, "Superhard Properties of Rhodium and Iridium Boride Films," ACS Applied Materials & Interfaces, vol. 2, pp. 581-587, Feb. 24, 2010 2010.

F. Lin, K. Wu, J. He, R. Sa, Q. Li and Y. Wei, Chem. Phys. Lett., 494 (2010) 31-36.

MECHANOCHEMICAL SYNTHESIS OF IRIDIUM DIBORIDE AND IRIDIUM MONOBORIDE

CROSS REFERENCE TO RELATED APPLICATIONS/INCORPORATION BY REFERENCE STATEMENT

The present application is a U.S. national stage application filed under 35 U.S.C. § 371 of International Application No. PCT/US2015/057602, filed Oct. 27, 2015; which claims priority of U.S. Provisional Application No. 62/069,299, filed Oct. 27, 2014. The entire contents of the above-referenced patent applications are hereby expressly incorporated herein by reference.

STATEMENT REGARDING FEDERALLY SPONSORED RESEARCH OR DEVELOPMENT

This invention was made with Government support under agency contact/grant no. DMR0748364 and IIP1343454 awarded by the National Science Foundation. The Government has certain rights in this invention.

FIELD

The present disclosure relates generally to a composition comprising hexagonal iridium diboride having a $ReB_2$-type structure and orthorhombic iridium monoboride, and methods of producing the same. In one embodiment, the hexagonal iridium diboride having a $ReB_2$-type structure and the orthorhombic iridium monoboride is produced by the mechanochemical synthesis of iridium and boron powders in a high energy ball mill followed by an annealing step.

The present disclosure also relates to a composition comprising iridium monoboride and at least one of (a) rows of single iridium atoms and/or (b) one or more clusters of iridium atoms, and methods of making such.

BACKGROUND

Borides are utilized in a range of industrial applications due to their unique electrical, thermal, mechanical, and catalytic properties. While many diborides find practical uses as abrasion and oxidation resistant coatings, there is an ongoing search for new phases and compositions that might possess interesting and useful properties.

In recent years, borides of osmium, rhenium, ruthenium, chromium, and tungsten have been studied for their ultra-hardness, superior stiffness, and high oxidation resistance. Interestingly, however, prior to the present disclosure, no experimental evidence existed for iridium diboride even though the other transition metals readily form diborides. Although theoretical calculations have predicted that iridium diboride may be stable in an orthorhombic $OsB_2$-type structure, no evidence existed prior to the present disclosure for an iridium sublattice with an increased level of boron content such as to produce iridium diboride.

DETAILED DESCRIPTION

Figure 1:
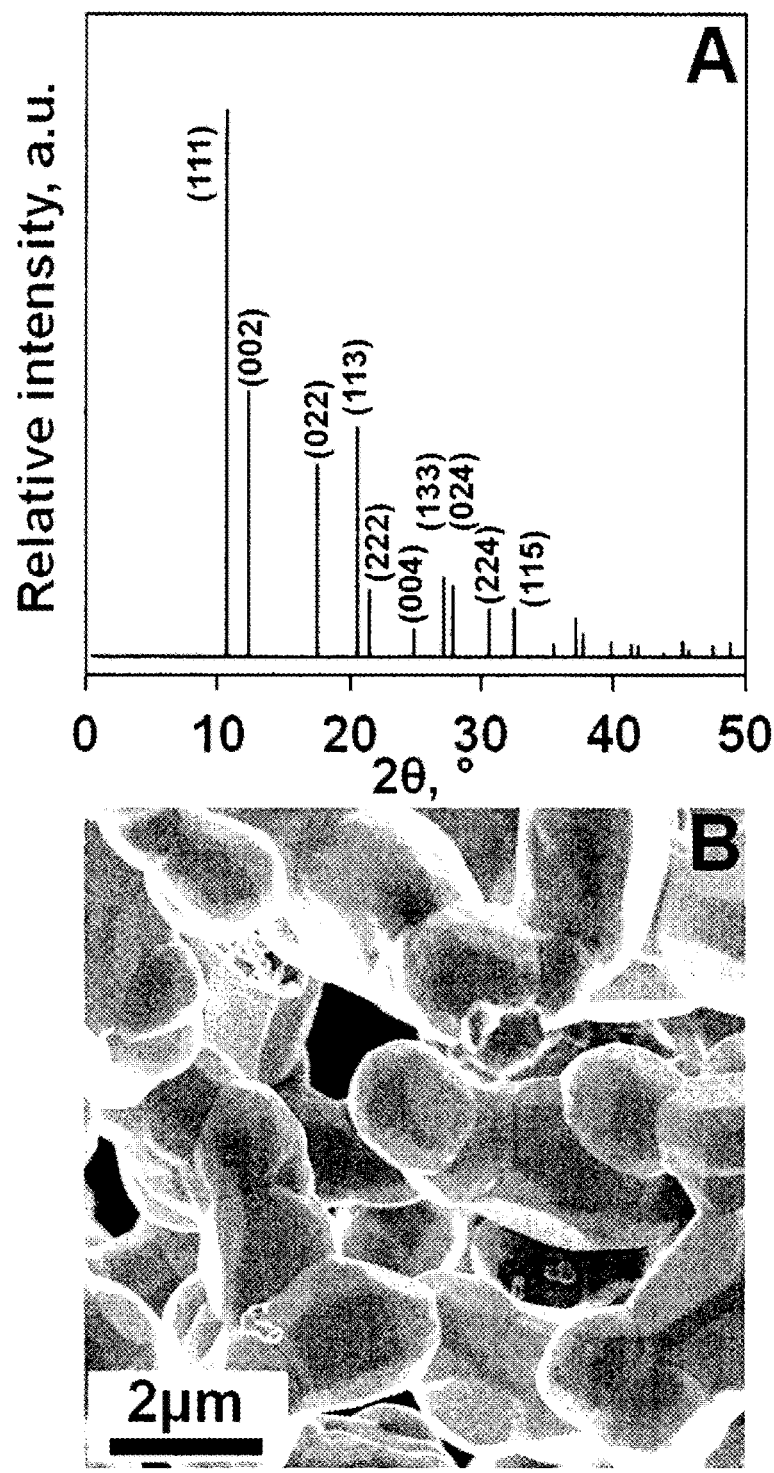
FIG. 1 shows a synchrotron XRD pattern (panel A) and a SEM image (panel B) of raw iridium powder.

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description or illustrated in the drawings. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the presently disclosed and/or claimed inventive concept(s) have been described in terms of preferred embodiments, it will be apparent to those of ordinary skill in the art that variations may be applied to the articles and/or methods and in the steps or in the sequence of steps of the method described herein without departing from the concept, spirit and scope of the presently disclosed and/or claimed inventive concept(s). All such similar substitutes and modifications apparent to those skilled in the art are deemed to be within the spirit, scope and concept of the presently disclosed and/or claimed inventive concept(s).

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

The terms "mechanochemical synthesis", "mechanochemical reaction", and "mechanochemical alloying," as well as derivations of such, are interchangeably used herein to reference a process of strain-induced synthesis of compounds. For example, in one embodiment, mechanochemical synthesis is done in a high energy ball mill, which utilizes both strong elastic and plastic shear deformations during milling to induce solid state chemical reactions at a lower pressure.

Turning to the present disclosure, a composition comprising at least one of iridium diboride and/or iridium monoboride is disclosed herein.

In one embodiment, the iridium diboride has a hexagonal $ReB_2$-type structure.

The unit cell dimension of the hexagonal $ReB_2$-type iridium diboride has the following lattice parameters: lattice constant "a" is in a range of from about 2.9 to about 3.1 Å, or from about 2.92 to about 3.07 Å, or from about 2.926 to about 3.071 Å; lattice constant "b" is the same as lattice constant a. That is, lattice constant b is in a range of from about 2.9 to about 3.1 Å, or from about 2.92 to about 3.07 Å, or from about 2.926 to about 3.071 Å; and lattice constant "c" is in a range of from about 7 to about 7.6 Å, or from about 7.07 to 7.55 Å, or from about 7.078 to about 7.543 Å.

In one embodiment, the iridium monoboride has an orthorhombic lattice.

In one embodiment, the orthorhombic iridium monoboride has a Pnma crystal structure having a unit cell dimension with the following lattice parameters: lattice constant "a" is in a range of from about 4.4 to about 5.6 Å, or from about 4.42 to about 5.5 Å, or from about 4.428 to about 5.544 Å; lattice constant "b" is from about 2.8 to about 3.3 Å, or from about 2.87 to about 3.3 Å, or from about 2.87 to about 3.244 Å; and lattice constant "c" is in a range of from about 6.2 to about 7.1 Å, or from about 6.23 to about 7.02 Å, or from about 6.239 to about 7.021 Å; and the angles between the lattice constants are all 90°—i.e., the angles between the lattice constants are $\alpha=\beta=\gamma=90°$.

In one embodiment, the composition further comprises the iridium boride phase $IrB_{1.35}$.

The unit cell dimension of the iridium boride phase $IrB_{1.35}$ has the following lattice parameters: lattice constant "a" is in a range of from about 10.5 to about 10.6 Å, or from about 10.52 to about 10.53 Å, or from about 10.525 to about 10.530 Å; lattice constant "b" is in a range of from about 2.8 to about 3 Å, or from about 2.89 to about 2.91 Å, or from about 2.897 to about 2.910 Å; and lattice constant "c" is from about 6 to about 6.1 Å, or from about 6.08 to about 6.1 Å, or from about 6.085 to about 6.099 Å; and the angles between the lattice constants are: $\alpha=\gamma=90°$ and $\beta$ is in a range of from about 91° to about 91.047°.

In one embodiment, the composition can comprise (a) the $ReB_2$-type iridium diboride in a range of from about 1 to about 10 wt %, or from about 5 to about 9.5 wt %, or from about 7 to about 9.4 wt %, or from about 7.5 to about 9.3 wt %, or from about 7.7 to about 9.2 wt %, or from about 5.2 to about 7.7 wt % of the composition, (b) the iridium monoboride in a range of from about 1 to about 20 wt %, or from about 2 to about 19 wt %, or from about 3 to about 18 wt %, or from about 4 to about 17 wt %, or from about 5 to about 16.5 wt %, or from about 5.2 to about 16.1 wt % of the composition, and/or (c) the $IrB_{1.35}$ phase of iridium boride at a range of from about 70 to about 90 wt %, or from about 75 to about 90 wt %, or from about 76 to about 86 wt %, or from about 76.2 to about 85.6 wt % of the composition.

The lattice parameters and amounts of the iridium boride phases disclosed herein may vary slightly depending on the measurement tool and/or technique used to measure the lattice parameters and/or weight percents. The term "about", as used with respect to the lattice parameters and weight percent values, is intended to take into account the natural variation between the available measuring techniques as well as the natural fluctuation in measurements taken by one or more of the techniques.

The present disclosure is directed to a method of producing a composition comprising at least one of the iridium diboride and/or iridium monoboride as described above.

The method of producing at least one of the above-described iridium diboride and/or iridium monoboride comprises (i) mechanochemically reacting iridium and boron and (ii) annealing the mechanochemically reacted iridium and boron.

In one embodiment, the iridium and boron subjected to the mechanochemical reaction and annealing steps are in the form of powders.

In one embodiment, the step of mechanochemically reacting the iridium and boron comprises reacting the iridium and boron in a high energy ball mill. One non-limiting example of a high energy ball mill is the 8000 Mixer/Mill® provided by SPEX Sample Prep (Metuchen, N.J.).

In one embodiment, the high energy ball mill comprises a container and milling media both of which are comprised of tungsten carbide. The milling media can comprise at least two balls comprised of tungsten carbide. In another embodiment, the container and milling media can be comprised of a hard metallic and/or ceramic material capable of milling iridium and boron with minimal damage to the media and container during the process. In one embodiment, the container and milling media are comprised of at least one of steel and/or zirconia.

In yet another embodiment, the iridium and boron can be reacted in any milling apparatus that provides the requisite forces to mechanochemically react the iridium and boron such that iridium diboride and/or iridium monoboride can eventually be produced by the method described herein.

In one embodiment, the iridium and boron are mechanochemically reacted for at least 1 hour, or at least 2 hours, or at least 5 hours, or at least 10 hours, or at least 15 hours, or at least 20 hours, or at least 25 hours, or at least 30 hours. In another embodiment, the iridium and boron are mechanochemically reacted for a time in a range of about 1 hour to about 72 hours, or about 2 hours to about 60 hours, or about 5 hours to about 55 hours, or about 10 hours to about 50 hours, or about 20 hours to about 40 hours, or about 25 hours to about 35 hours. In one embodiment, the iridium and boron are mechanochemically reacted for about 30 hours not including the interruptions.

In one embodiment, the pressure and temperature in the high energy ball mill are at atmospheric pressure and room temperature prior to mechanochemically reacting the iridium and boron. In one embodiment, the pressure in the high energy ball mill is at about atmospheric pressure prior to and during the mechanochemical reaction between the iridium and boron.

In one embodiment, the mechanochemical reacting of the iridium and boron is interrupted about every 5 minutes, or 10 minutes, or 15 minutes, or 20 minutes, or 25 minutes, or 30 minutes, or 45 minutes, or 1 hour, or 5 hours to allow the high energy ball mill to cool down. Not including the interruptions, the iridium and boron are mechanochemically reacted for at least 1 hour, or at least 2 hours, or at least 5 hours, or at least 10 hours, or at least 15 hours, or at least 20 hours, or at least 25 hours, or at least 30 hours. In another embodiment, the iridium and boron are mechanochemically reacted for a time in a range of about 1 hour to about 72 hours, or about 2 hours to about 60 hours, or about 5 hours to about 55 hours, or about 10 hours to about 50 hours, or about 20 hours to about 40 hours, or about 25 hours to about 35 hours. In one embodiment, the iridium and boron are mechanochemically reacted for about 30 hours.

The step of annealing the mechanochemically reacted iridium and boron comprises heating the mechanochemically reacted iridium and boron at a temperature in a range of from about 500° C. to about 2000° C., or from about 600° C. to about 1800° C., or from about 700° C. to about 1600° C., or from about 800° C. to about 1400° C., or from about 900° C. to about 1200° C., or from about 950° C. to about 1150° C., or from about 1000° C. to about 1100° C., or from about 1025° C. to about 1075° C. for a time in a range of from about 1 hour to about 96 hours, or from about 12 hours to about 60 hours, or from about 24 hours to about 72 hours, or from about 36 hours to about 60 hours, or from about 42 hours to about 54 hours, or from about 44 hours to about 52 hours, or from about 46 hours to about 50 hours. In one embodiment, the mechanochemically reacted iridium and boron are annealed at about 1050° C. for about 48 hours.

In one embodiment, the iridium and boron subjected to the mechanochemical reaction and annealing steps are added at a molar ratio in a range of from about 1:1 to about 1:5, or from about 1:2 to about 1:4, or from about 1:2.5 to about 1:3.5, or from about 1:2.7 to about 1:3.3 of iridium to boron. In one embodiment, the iridium and boron are added at a molar ratio of 1:3 of iridium to boron.

In one embodiment, the iridium and boron subjected to the mechanochemical reaction and annealing step are added in an amount such that the iridium and boron and the milling media have a weight ratio of about 5:1, or about 4:1, or about 3:1, or about 2.7:1 of the milling media to the iridium and boron. In one embodiment, the weight ratio of the milling media to the iridium and boron is about 2.7:1.

The present disclosure is also directed to at least one of an iridium diboride having a hexagonal $ReB_2$-type structure and/or an orthorhombic iridium monoboride produced by the above-described method.

Another aspect of the present disclosure is directed to a composition comprising (i) at least one phase of iridium boride chosen from $IrB_{1.1}$, $IrB_{1.35}$, iridium monoboride, and/or combinations thereof, and (ii) at least one of (a) one or more rows of single iridium atoms and/or (b) one or more clusters of iridium atoms.

In one embodiment, the iridium monoboride has an orthorhombic lattice.

In one embodiment, the orthorhombic iridium monoboride has a Pnma crystal structure having a unit cell dimension with the following lattice parameters: lattice constant "a" is in a range of from about 4.4 to about 5.6 Å, or from about 4.42 to about 5.5 Å, or from about 4.428 to about 5.544 Å; lattice constant "b" is from about 2.8 to about 3.3 Å, or from about 2.87 to about 3.3 Å, or from about 2.87 to about 3.244 Å; and lattice constant "c" is in a range of from about 6.2 to about 7.1 Å, or from about 6.23 to about 7.02 Å, or from about 6.239 to about 7.021 Å; and the angles between the lattice constants are all 90°—i.e., the angles between the lattice constants are $\alpha=\beta=\gamma=90°$.

In one embodiment, the composition further comprises the iridium boride phase $IrB_{1.35}$.

The unit cell dimension of the iridium boride phase $IrB_{1.35}$ has the following lattice parameters: lattice constant "a" is in a range of from about 10.5 to about 10.6 Å, or from about 10.52 to about 10.53 Å, or from about 10.525 to about 10.530 Å; lattice constant "b" is in a range of from about 2.8 to about 3 Å, or from about 2.89 to about 2.91 Å, or from about 2.897 to about 2.910 Å; and lattice constant "c" is from about 6 to about 6.1 Å, or from about 6.08 to about 6.1 Å, or from about 6.085 to about 6.099 Å; and the angles between the lattice constants are: $\alpha=\gamma=90°$ and $\beta$ is in a range of from about 91° to about 91.047°.

In one embodiment, the composition can comprise (a) the $IrB_{1.35}$ phase of iridium boride at a range of from about 40 to about 60 wt %, or from about 45 to about 55 wt %, or from about 48 to about 52 wt %, or from about 50 to about 52 wt % of the composition, (b) the $IrB_{1.1}$ phase of iridium boride at a range of from about 25 to about 45 wt %, or from about 30 to about 40 wt %, or from about 32 to about 38 wt %, or from about 33 to about 36 wt % of the composition, and (c) the iridium monoboride in a range of from about 5 to about 25 wt %, or from about 10 to about 20 wt %, or from about 13 to about 17 wt %, or from about 13.5 to about 14.5 wt % of the composition.

In one embodiment, the composition is in the form of powder having crystallites ranging in size from about 35 nm to about 85 nm, or from about 40 nm to about 80 nm, or from about 45 nm to about 75 nm, or from about 50 nm to about 70 nm, or from about 55 nm to about 65 nm.

The present disclosure is also directed to a method of producing a composition comprising iridium monoboride and at least one of (a) one or more rows of single iridium atoms and/or (b) one or more clusters of iridium atoms, wherein the method comprises (i) mechanochemically reacting iridium and boron and (ii) annealing the mechanochemically reacted iridium and boron.

In one embodiment, the iridium and boron subjected to the mechanochemical reaction and annealing steps are in the form of powders.

In one embodiment, the step of mechanochemically reacting the iridium and boron comprises reacting the iridium and boron in a high energy ball mill. One non-limiting example of a high energy ball mill is the 8000 Mixer/Mill® provided by SPEX Sample Prep (Metuchen, N.J.).

In one embodiment, the high energy ball mill comprises a container and milling media both of which are comprised of tungsten carbide. The milling media can comprise at least two balls comprised of tungsten carbide. In another embodiment, the container and milling media can be comprised of a hard metallic and/or ceramic material capable of milling iridium and boron with minimal damage to the media and container during the process. In one embodiment, the container and milling media are comprised of at least one of steel and/or zirconia.

In yet another embodiment, the iridium and boron can be reacted in any milling apparatus that provides the requisite forces to mechanochemically react the iridium and boron such that iridium diboride and/or iridium monoboride can eventually be produced by the method described herein.

In one embodiment, the pressure and temperature in the high energy ball mill are at atmospheric pressure and room temperature prior to mechanochemically reacting the iridium and boron. In one embodiment, the pressure in the high energy ball mill is at about atmospheric pressure prior to and during the mechanochemical reaction between the iridium and boron.

In one embodiment, the iridium and boron are mechanochemically reacted for at least 60 hours, or at least 70 hours, or at least 80 hours, or at least 90 hours.

In one embodiment, the iridium and boron are mechanochemically reacted for a time in a range from about 60 hours to about 120 hours, or from about 65 hours to about 115 hours, or from about 70 hours to about 110 hours, or from about 75 hours to about 105 hours, or from about 80 hours to about 100 hours, or from about 85 hours to about 95 hours.

In one embodiment, the iridium and boron are mechanochemically reacted for about 90 hours.

The step of annealing the mechanochemically reacted iridium and boron comprises heating the mechanochemically reacted iridium and boron at a temperature in a range of from about 500° C. to about 2000° C., or from about 600° C. to about 1800° C., or from about 700° C. to about 1600° C., or from about 800° C. to about 1400° C., or from about 900° C. to about 1200° C., or from about 950° C. to about 1150° C., or from about 1000° C. to about 1100° C., or from about 1025° C. to about 1075° C. for a time in a range of from about 50 hours to about 120 hours, or from about 55 hours to about 110 hours, or from about 60 hours to about 100 hours, or from about 65 hours to about 90 hours, or from about 70 hours to about 80 hours, or from about 70 hours to about 75 hours to produce the composition comprising iridium monoboride and at least one of (a) one or more rows of single iridium atoms and (b) one or more clusters of iridium atoms.

In one embodiment, the mechanochemically reacted iridium and boron are annealed at about 1050° C. for about 72 hours to produce the composition comprising iridium monoboride and at least one of (a) one or more rows of single iridium atoms and (b) one or more clusters of iridium atoms.

In one embodiment, the iridium and boron subjected to the mechanochemical reaction and annealing steps are added at a molar ratio in a range of from about 1:1 to about 1:5, or from about 1:2 to about 1:4, or from about 1:2.5 to about 1:3.5, or from about 1:2.7 to about 1:3.3 of iridium to boron. In one embodiment, the iridium and boron are added at a molar ratio of 1:3 of iridium to boron.

In one embodiment, the iridium and boron subjected to the mechanochemical reaction and annealing step are added in an amount such that the iridium and boron and the milling media have a weight ratio of about 5:1, or about 4:1, or about 3:1, or about 2.7:1 of the milling media to the iridium and boron. In one embodiment, the weight ratio of the milling media to the iridium and boron is about 2.7:1.

Yet another aspect of the present disclosure is directed to a method of producing a composition comprising at least one of iridium diboride, iridium monoboride, one or more rows of single iridium atoms, and one or more clusters of iridium atoms, the method comprising (i) mechanochemically reacting iridium and boron, and (ii) annealing the mechanochemically reacted iridium and boron.

In one embodiment, the iridium and boron subjected to the mechanochemical reaction and annealing steps are in the form of powders.

In one embodiment, the step of mechanochemically reacting the iridium and boron comprises reacting the iridium and boron in a high energy ball mill. One non-limiting example of a high energy ball mill is the 8000 Mixer/Mill® provided by SPEX Sample Prep (Metuchen, N.J.).

In one embodiment, the high energy ball mill comprises a container and milling media both of which are comprised of tungsten carbide. The milling media can comprise at least two balls comprised of tungsten carbide. In another embodiment, the container and milling media can be comprised of a hard metallic and/or ceramic material capable of milling iridium and boron with minimal damage to the media and container during the process. In one embodiment, the container and milling media are comprised of at least one of steel and/or zirconia.

In yet another embodiment, the iridium and boron can be reacted in any milling apparatus that provides the requisite forces to mechanochemically react the iridium and boron such that iridium diboride and/or iridium monoboride can eventually be produced by the method described herein.

In one embodiment, the pressure and temperature in the high energy ball mill are at atmospheric pressure and room temperature prior to mechanochemically reacting the iridium and boron. In one embodiment, the pressure in the high energy ball mill is at about atmospheric pressure prior to and during the mechanochemical reaction between the iridium and boron.

In one embodiment, the iridium and boron subjected to the mechanochemical reaction and annealing steps are added at a molar ratio in a range of from about 1:1 to about 1:5, or from about 1:2 to about 1:4, or from about 1:2.5 to about 1:3.5, or from about 1:2.7 to about 1:3.3 of iridium to boron. In one embodiment, the iridium and boron are added at a molar ratio of 1:3 of iridium to boron.

In one embodiment, the iridium and boron subjected to the mechanochemical reaction and annealing step are added in an amount such that the iridium and boron and the milling media have a weight ratio of about 5:1, or about 4:1, or about 3:1, or about 2.7:1 of the milling media to the iridium and boron. In one embodiment, the weight ratio of the milling media to the iridium and boron is about 2.7:1.

In one embodiment, the iridium and boron are mechanochemically reacted for at least 30 hours and annealed for a time in a range of from about 1 hour to about 60 hours, or from about 12 hours to about 58 hours, or from about 24 hours to about 56 hours, or from about 36 hours to about 54 hours, or from about 42 hours to about 55 hours, or from about 46 hours to about 50 hours at a temperature of from about 500° C. to about 2000° C., or from about 600° C. to about 1800° C., or from about 700° C. to about 1600° C., or from about 800° C. to about 1400° C., or from about 900° C. to about 1200° C., or from about 950° C. to about 1150° C., or from about 1000° C. to about 1100° C., or from about 1025° C. to about 1075° C. to produce a composition comprising at least one of iridium diboride and iridium monoboride.

In one embodiment, the iridium and boron are mechanochemically reacted for a time in a range of from about 2 hours to about 120 hours, or from about 2 hours to about 60 hours, or from about 10 hours to about 50 hours, or from about 20 hours to about 40 hours, or from about 25 hours to about 35 hours and annealed for a time in a range of from about 1 hour to about 60 hours, or from about 12 hours to about 58 hours, or from about 24 hours to about 56 hours, or from about 36 hours to about 54 hours, or from about 42 hours to about 55 hours, or from about 46 hours to about 50 hours at a temperature of from about 500° C. to about 2000° C., or from about 600° C. to about 1800° C., or from about 700° C. to about 1600° C., or from about 800° C. to about 1400° C., or from about 900° C. to about 1200° C., or from about 950° C. to about 1150° C., or from about 1000° C. to about 1100° C., or from about 1025° C. to about 1075° C. to produce a composition comprising at least one of iridium diboride and iridium monoboride.

In one embodiment, the iridium and boron are mechanochemically reacted for about 30 hours and annealed for a time in a range of from about 12 hours to about 60 hours at a temperature of from about 950° C. to about 1150° C. to produce a composition comprising at least one of iridium diboride and iridium monoboride.

In one embodiment, the iridium and boron are mechanochemically reacted for about 30 hours and annealed for about 48 hours at about 1050° C. to produce a composition comprising at least one of iridium diboride and iridium monoboride.

In one embodiment, the iridium and boron are mechanochemically reacted for at least 30 hours and annealed for a time in a range of from about 1 hour to about 60 hours, or from about 12 hours to about 58 hours, or from about 24 hours to about 56 hours, or from about 36 hours to about 54 hours, or from about 42 hours to about 55 hours, or from about 46 hours to about 50 hours at a temperature of from about 500° C. to about 2000° C., or from about 600° C. to about 1800° C., or from about 700° C. to about 1600° C., or from about 800° C. to about 1400° C., or from about 900° C. to about 1200° C., or from about 950° C. to about 1150° C., or from about 1000° C. to about 1100° C., or from about 1025° C. to about 1075° C. to produce a composition comprising both iridium diboride and iridium monoboride.

In one embodiment, the iridium and boron are mechanochemically reacted for a time in a range of from about 2 hours to about 120 hours, or from about 2 hours to about 60 hours, or from about 10 hours to about 50 hours, or from about 20 hours to about 40 hours, or from about 25 hours to about 35 hours and annealed for a time in a range of from about 1 hour to about 60 hours, or from about 12 hours to about 58 hours, or from about 24 hours to about 56 hours, or from about 36 hours to about 54 hours, or from about 42 hours to about 55 hours, or from about 46 hours to about 50 hours at a temperature of from about 500° C. to about 2000° C., or from about 600° C. to about 1800° C., or from about 700° C. to about 1600° C., or from about 800° C. to about 1400° C., or from about 900° C. to about 1200° C., or from about 950° C. to about 1150° C., or from about 1000° C. to about 1100° C., or from about 1025° C. to about 1075° C. to produce a composition comprising both iridium diboride and iridium monoboride.

In one embodiment, the iridium and boron are mechanochemically reacted for about 30 hours and annealed for a time in a range of from about 12 hours to about 60 hours at a temperature of from about 950° C. to about 1150° C. to produce a composition comprising both iridium diboride and iridium monoboride.

In one embodiment, the iridium and boron are mechanochemically reacted for about 30 hours and annealed for about 48 hours at about 1050° C. to produce a composition comprising both iridium diboride and iridium monoboride.

In one embodiment, the iridium and boron are mechanochemically reacted for at least 90 hours and annealed for at least 60 hours at a temperature of from about 500° C. to about 2000° C., or from about 600° C. to about 1800° C., or from about 700° C. to about 1600° C., or from about 800° C. to about 1400° C., or from about 900° C. to about 1200° C., or from about 950° C. to about 1150° C., or from about 1000° C. to about 1100° C., or from about 1025° C. to about 1075° C. to produce a composition comprising iridium monoboride and at least one of (a) one or more rows of single iridium atoms and (b) one or more clusters of iridium atoms.

In one embodiment, the iridium and boron are mechanochemically reacted for a time in a range from about 60 hours to about 120 hours, or from about 65 hours to about 115 hours, or from about 70 hours to about 110 hours, or from about 75 hours to about 105 hours, or from about 80 hours to about 100 hours, or from about 85 hours to about 95 hours, and annealed for a time in a range of from about 50 hours to about 120 hours, or from about 55 hours to about 110 hours, or from about 60 hours to about 100 hours, or from about 65 hours to about 90 hours, or from about 70 hours to about 80 hours, or from about 70 hours to about 75 hours at a temperature of from about 500° C. to about 2000° C., or from about 600° C. to about 1800° C., or from about 700° C. to about 1600° C., or from about 800° C. to about 1400° C., or from about 900° C. to about 1200° C., or from about 950° C. to about 1150° C., or from about 1000° C. to about 1100° C., or from about 1025° C. to about 1075° C. to produce a composition comprising iridium monoboride and at least one of (a) one or more rows of single iridium atoms and (b) one or more clusters of iridium atoms.

In one embodiment, the iridium and boron are mechanochemically treated for about 90 hours and annealed for a time in a range of from about 60 to 90 hours at a temperature of from about 950° C. to about 1150° C. to produce a composition comprising iridium monoboride and at least one of (a) one or more rows of single iridium atoms and (b) one or more clusters of iridium atoms.

In one embodiment, the iridium and boron are mechanochemically treated for about 90 hours and annealed for about 72 hours at about 1050° C. to produce a composition comprising iridium monoboride and at least one of (a) one or more rows of single iridium atoms and (b) one or more clusters of iridium atoms.

The iridium borides disclosed herein are expected to have ultra-high hardness, high oxidation resistance, and/or catalytic activity. As such, the iridium borides disclosed herein, and/or compositions comprising such, can be used for a variety of applications, including: as cutting tools, polishing materials, wear resistant coatings, and thermo-oxidation protection layers for ultra-high speed vehicles (e.g., spacecraft). Additionally, the compositions comprising at least one of (a) one or more rows of single iridium atoms and/or (b) one or more clusters of iridium atoms are expected to have high catalytic activity and can be used as catalysts for combustion and fuel cells.

EXAMPLES

Examples are provided herein below. However, the present disclosure is understood to not be limited in its application to the specific experimentation, results, and laboratory procedures disclosed herein below. Rather, the Examples are simply provided as one of various embodiments and are meant to be exemplary and not exhaustive.

The following examples were carried out by mechanochemical synthesis of elemental powder compounds. Specifically, the examples are directed to the mechanochemical synthesis of hexagonal $ReB_2$-type iridium diboride and orthorhombic monoboride phases from powdered iridium and boron. During the mechanochemical synthesis, chemical reactions occur between the reactants by deforming the reactants through cold welding, fracturing, and re-welding the reactant particles in a ball mill apparatus followed by annealing the mechanochemically reacted iridium and boron powders.

In one non-limiting explanation, the mechanochemical synthesis is able to occur at or near room temperature and atmospheric pressure, especially when the iridium and boron are in powder form, as a result of the high diffusivity of the particles, low diffusion distances, and increased density of crystalline defects as a result of, for example, ball milling the iridium and boron powders in a closed container.

Figure 2:
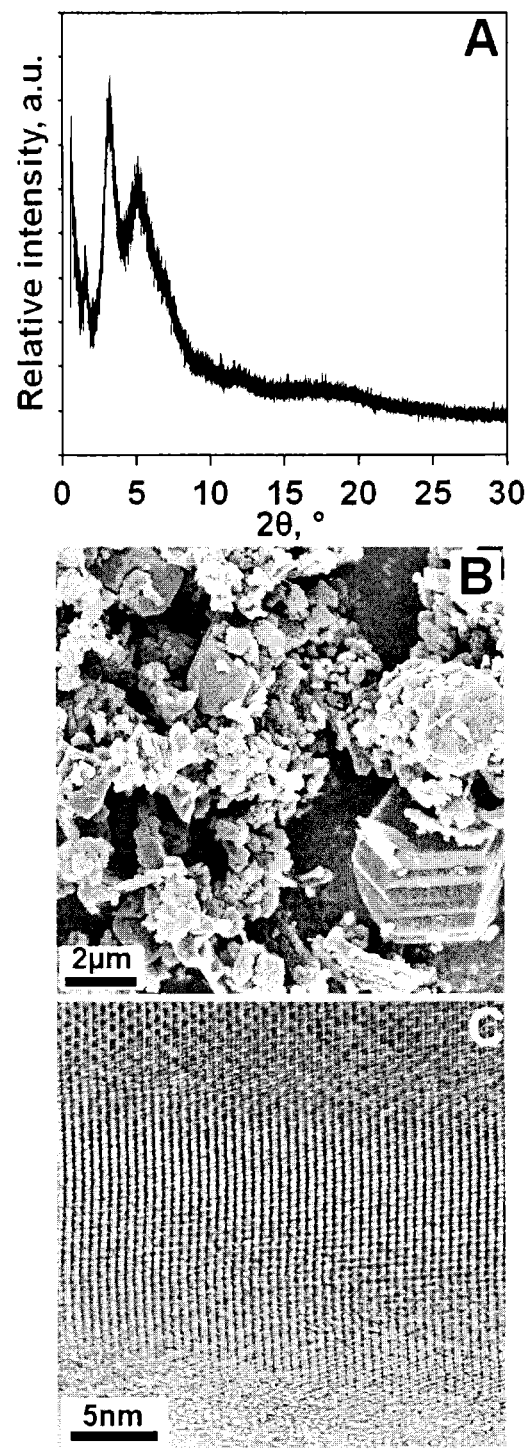
FIG. 2 shows a synchrotron XRD pattern (panel A), a SEM image (panel B), and a bright-field STEM image (panel C) of raw boron powder.

Iridium metal powder (99.9% pure available from Precious Metal Purchase, United States) and boron powder (99% pure, −235 mesh, amorphous and crystalline available from Alfa Aesar, Ward Hill, Mass.) were used as starting materials. High-resolution synchrotron X-ray diffraction (XRD) pattern and scanning electron micrographs (SEM) of the iridium metal powder starting material are illustrated in panels A and B of FIG. 1, respectively. The high-resolution synchrotron XRD pattern, SEM, and high resolution scanning transmission electron micrographs (STEM) of the boron powder starting material are shown in panels A-C of FIG. 2, respectively.

A total of 11.7 grams of the iridium and boron powders (molar ratio of iridium to boron of 1:3) were loaded into the tungsten carbide vial of the 8000 Mixer/Mill® available from SPEX Sample Prep (Metuchen, N.J.) having an internal volume of 54 mL. Two 12.7 mm diameter tungsten carbide balls were used as milling media such that the weight ratio of the tungsten carbide ball and the iridium and boron powders was 2.74.

Figure 3:
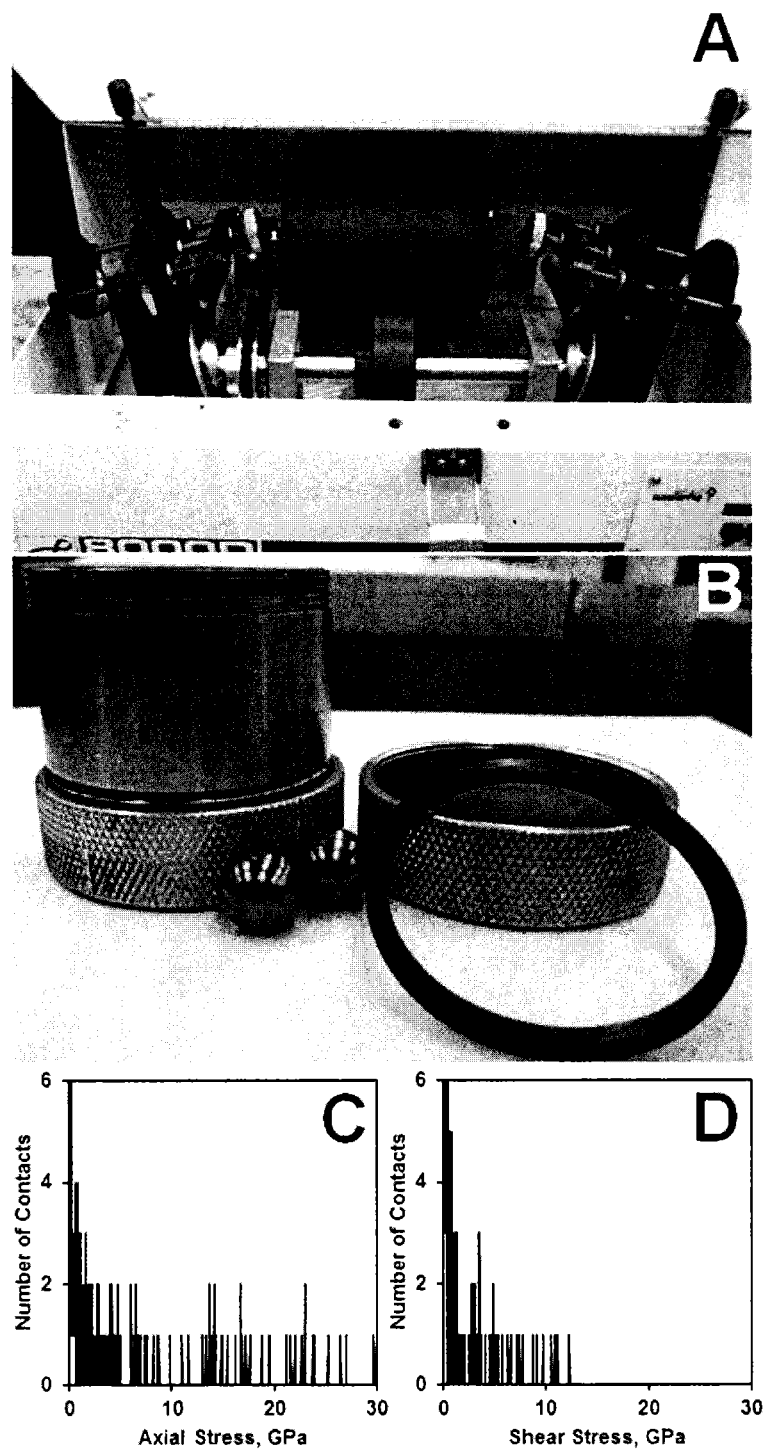
FIG. 3 shows a 8000D Mixer/Mill® (panel A), a tungsten carbide milling vial set (panel B), and axial (panel C) and shear (panel D) stresses produced by high energy ball milling simulation.
Figure 4:
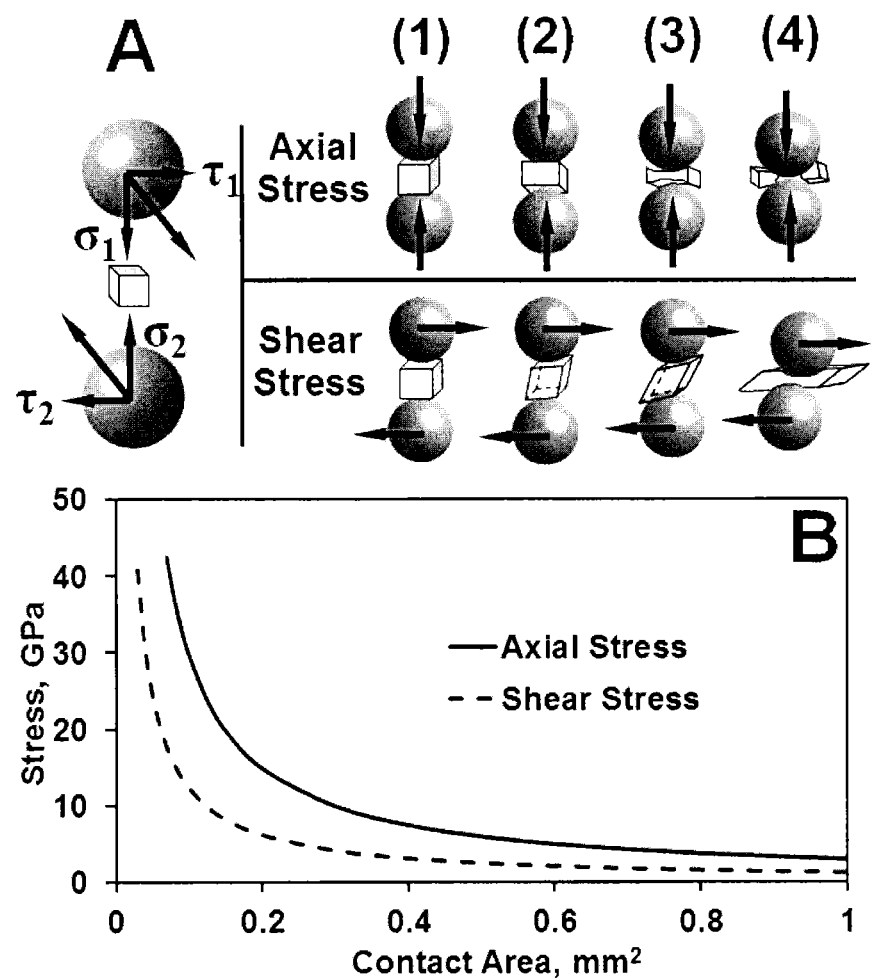
FIG. 4 shows a mechanism of high-energy ball milling (panel A) and maximum axial and shear stresses present during mechanochemical synthesis of the iridium boride compound as a function of contact area (panel B).

An image of the ball mill apparatus is depicted in panel A of FIG. 3 and the milling vial (i.e., "container") and milling media are depicted in panel B of FIG. 3. The frequencies of axial and shear impact stresses generated by the milling media, i.e., the tungsten carbide balls, inside the empty tungsten carbide vial during operation is shown in panels C and D of FIG. 3, respectively. A schematic presentation of the axial and shear stresses acting on a particle during milling is illustrated in panel A of FIG. 4, and the estimated applied axial and shear stresses present during mechanochemical synthesis as a function of contact area are shown in panel B of FIG. 4.

All loading operations were carried out in an argon-filled glovebox. The milling vial and media were coated with iridium boron (boride) powders from an initial milling, which allows reduction and even complete elimination of WC contamination, from the milling jar and media, in the iridium boride powders.

30 Hours Milling Followed By Annealing for 48 Hours at 1050° C.

The first synthesis was performed by applying mechanical force with the 8000 Mixer/Mill® for a total of 30 hours. The vials shook at 1200 cycles per minute while operating the 8000 Mixer/Mill®. Every 30 minutes the milling was interrupted and the vials were left for 30 minutes without grinding in order to decrease the vials' temperature and reduce wear on the mill's motor.

After 30 hours of milling, a small amount of sample was removed for phase analysis by XRD. One gram of the milled powder was taken from the vial, pressed into a small pellet and annealed in vacuo (~7 Pa) in a quartz ampule at 1050° C. for 48 hours. Collections of the ground powder were always performed in an argon-filled glovebox to control exposure to oxygen.

After annealing, the phase compositions of the powders were analyzed by traditional laboratory XRD along with high-resolution synchrotron XRD. An X'Pert Pro MPD system with a copper source (Cu Kα1=1.5418 Å) available from PANalytical (Almelo, Netherlands) was used to record XRD patterns of the powder. High resolution powder XRD patterns were also collected with synchrotron X-rays (λ=0.4137 Å) at the Advanced Photon Source (Beamline 11-BM), Argonne National Laboratory. The sample powders for synchrotron XRD were coated on capillary tubes to reduce absorption. Refinement of the structure was performed using the HighScore Plus software also available from PANalytical.

Figure 5:
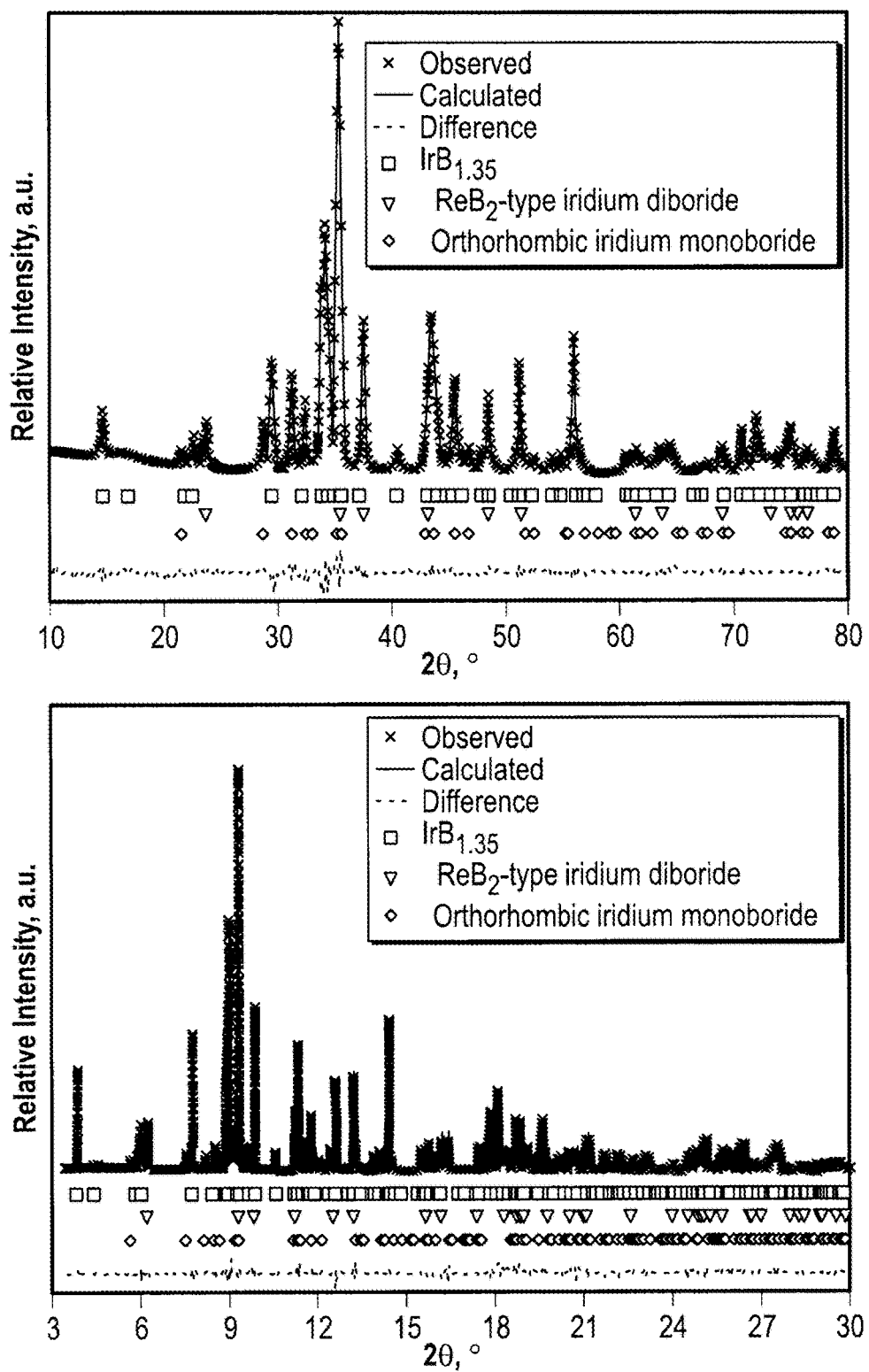
FIG. 5 shows Rietveld refinement of the X-Ray Diffractogram for the iridium and boron powder mixture after 30 hours of ball milling and 48 hours of annealing with a laboratory XRD (panel A) and a synchrotron source (panel B).

The laboratory XRD pattern of the reaction product after the steps of mechanochemical reaction and annealing is illustrated in Panel A of FIG. 5. As can be seen in Panel A of FIG. 5, a mixture of three iridium boride phases are present in the reaction product after 30 hours of milling the iridium and 48 hours of annealing. Along with the $IrB_{1.35}$ structure, a new $ReB_2$-type iridium diboride structure and a new orthorhombic iridium monoboride structure were identified that were previously only theorized or unknown prior to the present disclosure. Using Rietveld refinement, it was determined that the reaction product comprised about 76.2 wt % of the $IrB_{1.35}$ phase, 7.7 wt % of the $ReB_2$-type iridium diboride phase, and 16.1 wt % of the orthorhombic iridium monoboride phase.

Additionally, the high-resolution synchrotron XRD pattern of the same reaction product is illustrated in Panel B of FIG. 5. Similar to the laboratory X-ray diffraction analysis, the same three iridium boride phases have been identified in the batch by Rietveld refinement but the quantities of the phases present were slightly different from the quantities of the phases measured by the laboratory diffractometer. As determined by synchrotron XRD, the major phase in the batch was $IrB_{1.35}$ at 85.6 wt %, while $ReB_2$-type iridium diboride phase was present at 9.2 wt % and orthorhombic iridium monoboride was identified to be 5.2 wt %.

The lattice parameters and quantities of the phases as determined by synchrotron XRD source are also shown in Table 1 along with the data calculated by using the laboratory X-ray diffraction pattern. It should be noted that a significant difference in the relative wt % of iridium monoboride was observed between the two measurements. This discrepancy between the laboratory and synchrotron PXRD can be ascribed to the absorbing nature of the sample, especially at $CuK\alpha$ energies, and the differences in absorption of the constituents of the sample. This is further exacerbated by the differences in geometry in the experiments, i.e., flat plate vs. capillary. Due to this the values modeled from the synchrotron PXRD are more representative of the true sample composition.

TABLE I

| | Iridium Boride Phases | Lattice Parameters, Å | | | Weight Fraction, % |
|---|---|---|---|---|---|
| | | a | b | c | |
| Refinement of Laboratory XRD Pattern | $IrB_{1.35}$ | 10.525 | 2.897 | 6.085 | 76.2 |
| | Hexagonal $ReB_2$-type Iridium Diboride | 2.926 | 2.926 | 7.543 | 7.7 |
| | Orthorhombic Iridium Monoboride | 5.541 | 3.239 | 6.239 | 16.1 |
| Refinement of Synchrotron XRD Pattern | $IrB_{1.35}$ | 10.530 | 2.898 | 6.086 | 85.6 |
| | Hexagonal $ReB_2$-type Iridium Diboride | 2.926 | 2.926 | 7.547 | 9.2 |
| | Orthorhombic Iridium Monoboride | 5.544 | 3.244 | 6.242 | 5.2 |

The morphology and particle size of the powders were examined in a MERLIN SEM available from Zeiss (Oberkochen, Germany) equipped with a silicon drift energy dispersive X-ray spectroscopy (EDS) detector capable of detecting low Z elements such as boron. A JEM2200FS aberration-corrected high-resolution scanning transmission electron microscope (HRSTEM) available from Jeol, Ltd. (Tokyo, Japan) was used to obtain high-resolution images of the iridium boride nanoparticles.

Figure 6:
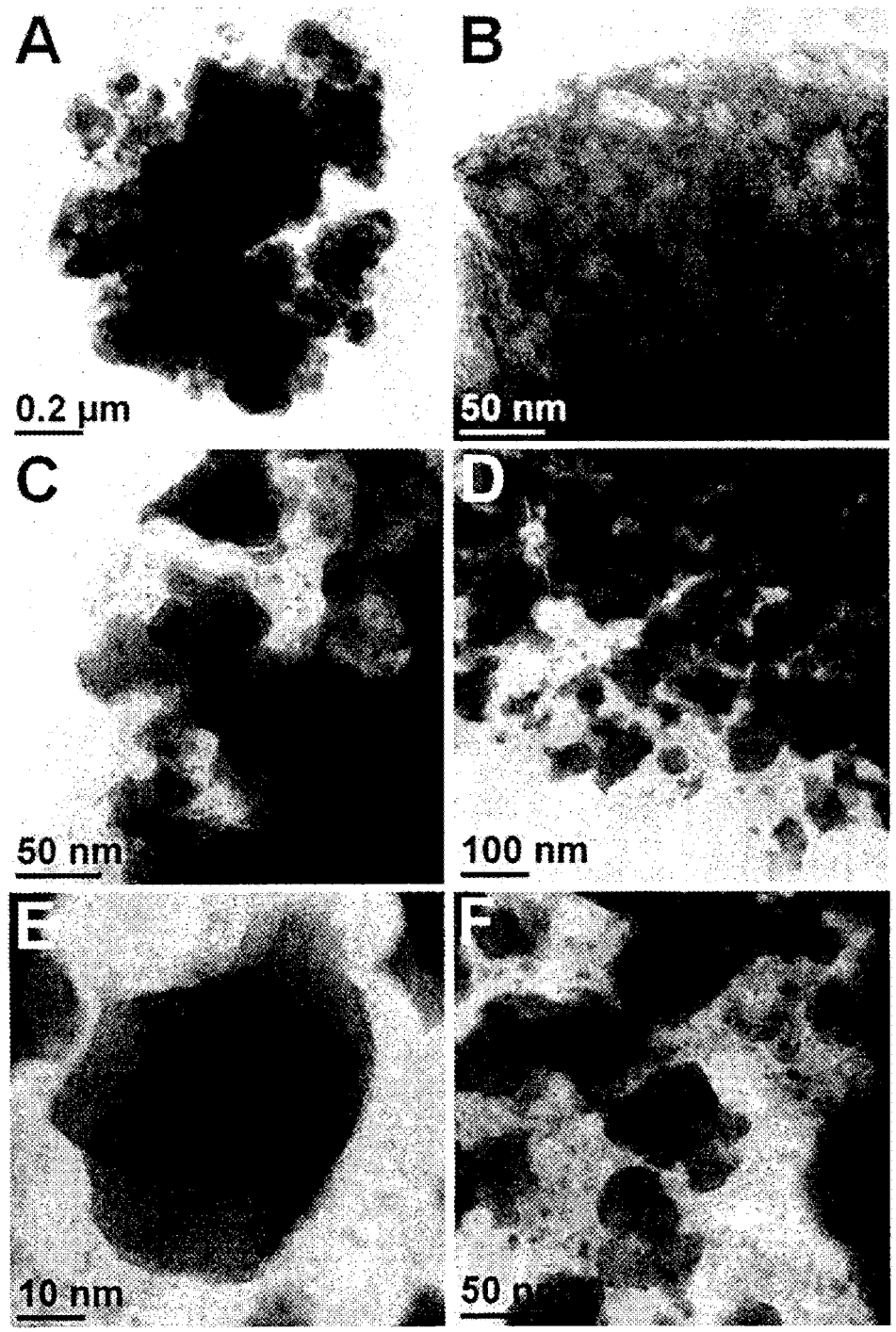
FIG. 6 shows STEM images of the iridium and boron powder mixture after 30 hours of ball milling and 48 hours of annealing.

The bright field STEM micrographs of the reaction product after 30 hours of milling and 48 hours of annealing at 1050° C. are shown in FIG. 6. All 6 STEM micrographs of powder shown in panels A-F of FIG. 6 represent different structures of iridium boride phases, as further identified by HRSTEM and illustrated in panels A-F of FIGS. 7 and 8.

Panel A of FIG. 6 represents, in part, a non-reacted pure boron particle. Panel A of FIG. 7 is a bright field STEM image and panel B of FIG. 7 is a high angle annular dark field (Z contrast) STEM image of the particle depicted in panel A of FIG. 6.

Figure 7:
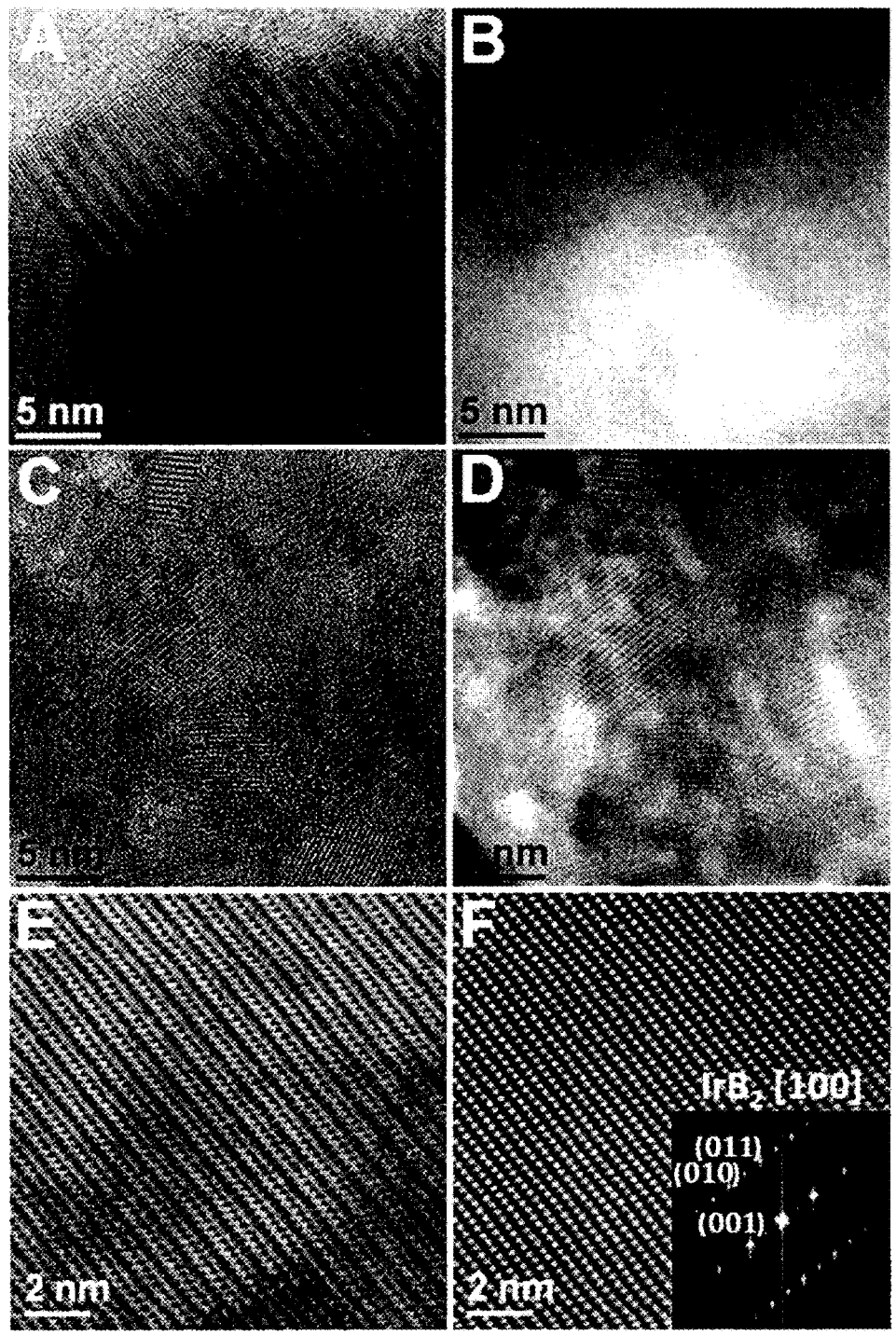
FIG. 7 shows STEM images of the iridium and boron powder mixture after 30 hours of ball milling and 48 hours of annealing.

The powder particle presented in panel B of FIG. 6 appears to consist of many very tiny crystallites, as presented by bright and dark field STEM micrographs in panels C and D of FIG. 7, respectively.

The $ReB_2$-type hexagonal iridium diboride structure was found among the particles represented in panel C of FIG. 6. The corresponding bright and dark field STEM images of the hexagonal iridium diboride phase oriented in [100] direction are shown in HRSTEM images of panels E and F of FIG. 7, respectively.

Three more different structures have been identified upon higher magnification of particles of the reaction product shown in FIGS. 6 D-F. The bright and dark HRSTEM images (panels A and B of FIG. 8, respectively) of one of the particles shown in panel D of FIG. 6 depict a new iridium monoboride structure oriented along [131] zone axis.

Figure 8:
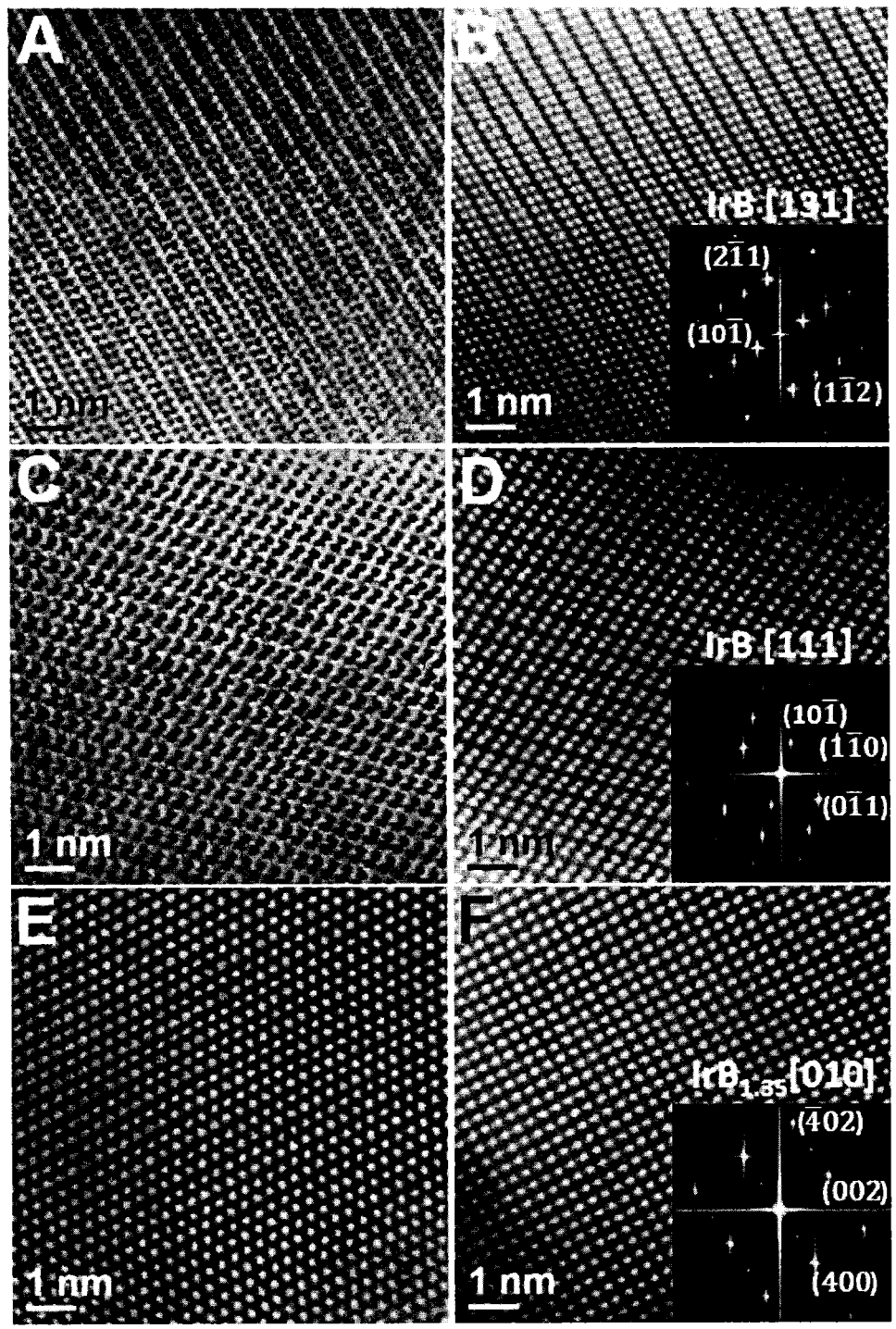
FIG. 8 shows high resolution STEM images of the iridium and boron powder mixture after 30 hours of ball milling and 48 hours of annealing.

The same iridium monoboride structure oriented along the [111] direction rather than the [131] zone axis is shown in panels C and D of FIG. 8. These high-resolution STEM micrographs were taken upon higher magnification of the particle shown in panel E of FIG. 6.

The $IrB_{1.35}$ phase was identified in panel F of FIG. 6 with the bright and dark HRSTEM images of the $IrB_{1.35}$ oriented along [010] direction as shown in panels E and F of FIG. 8, respectively.

The STA 449 F3 Jupiter® apparatus available from Netzsch (Selb, Germany) was used for DTA-TG measurements in 40 ml/min argon flow. Thermal analyses were performed up to 1400° C. with a heating rate of 10° C./min. Alumina crucibles with h-BN protective film were used. The DTA-TG data presented in this paper has subtracted the BN baseline, which has no obvious peaks.

Figure 9:
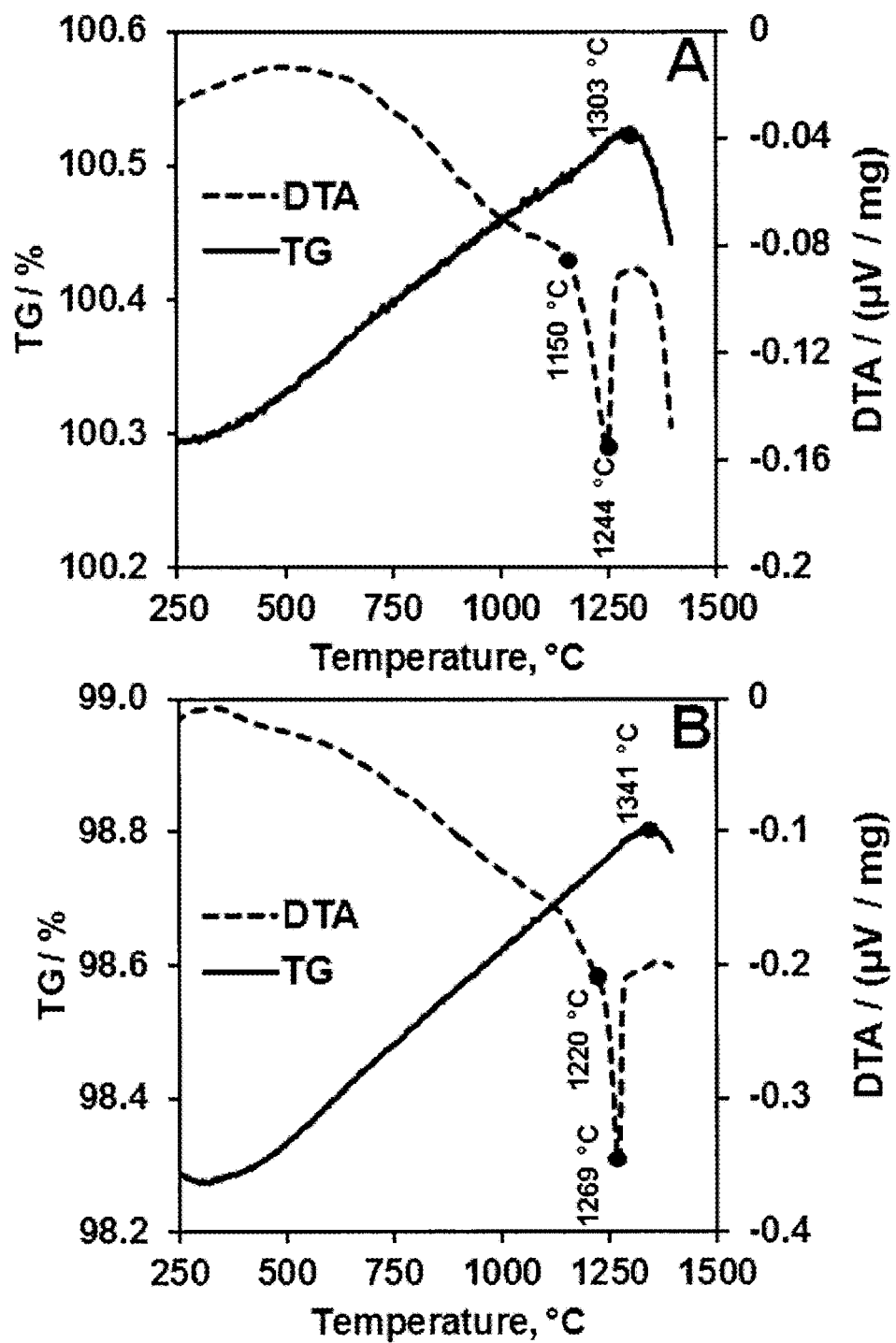
FIG. 9 shows the thermogravimetric and differential thermal analysis of iridium and boron powder mixture after 30 hours of milling (panel A) and after 30 hours of milling and 48 hour of annealing (panel B).

The thermogravimetry ("TG") and differential thermal analysis ("DTA") results of the iridium and boron powder after only 30 hours of milling and after 30 hours of milling and 48 hours of annealing are presented in panels A and B of FIG. 9, respectively. The TG results show the weight gain during heating up to ~1300° C. or higher in both cases, which can be explained by the oxygen interaction with the powder with the formation of boron oxide all the way to the 1150-1220° C. temperatures, where the DTA peak appears indicating the appearance of the phase transition. Such phase transition can be explained by the beginning of evaporation process of $B_2O_3$, which occurs at around 1244-1269° C. for very fine powders. As evaporation process initiated, one can see the beginning of the weight loss of iridium boride powder, which is connected to the B and 0 atoms leaving the surface as vapors. The differences in the liquid to vapor phase transition temperature for the iridium boride powders, with and without annealing, can be explained that after annealing at 1050° C. in vacuum the powder coarsened with particle sizes increased from ~60 nm to ~110 nm and such coarse particles were more resistant to oxidation and thus the evaporation temperature increased for the iridium boride powder after annealing.

90 Hours Milling Followed by Annealing for 72 Hours at 1050° C.

A portion of the iridium and boron powders milled for a total of 30 hours were allowed to be milled for an additional 60 hours under the same conditions allowing for a 30 minute interruption every 30 minutes in order to decrease the vials' temperature and reduce wear on the mill's motor.

After a total of 90 hours of milling, a small amount of the sample was removed for phase analysis by XRD. One gram of the milled powder was taken from the vial, pressed into a small pellet and annealed in vacuo (~7 Pa) in a quartz ampule at 1050° C. for 72 hours. Collections of the ground powder were always performed in an argon-filled glovebox to control exposure to oxygen.

After annealing, the phase compositions of the powders were analyzed by traditional laboratory XRD. An X'Pert Pro MPD system with a copper source (Cu K$\alpha$I=1.5418 Å) available from PANalytical (Almelo, Netherlands) was used to record XRD patterns of the powder.

Figure 10:
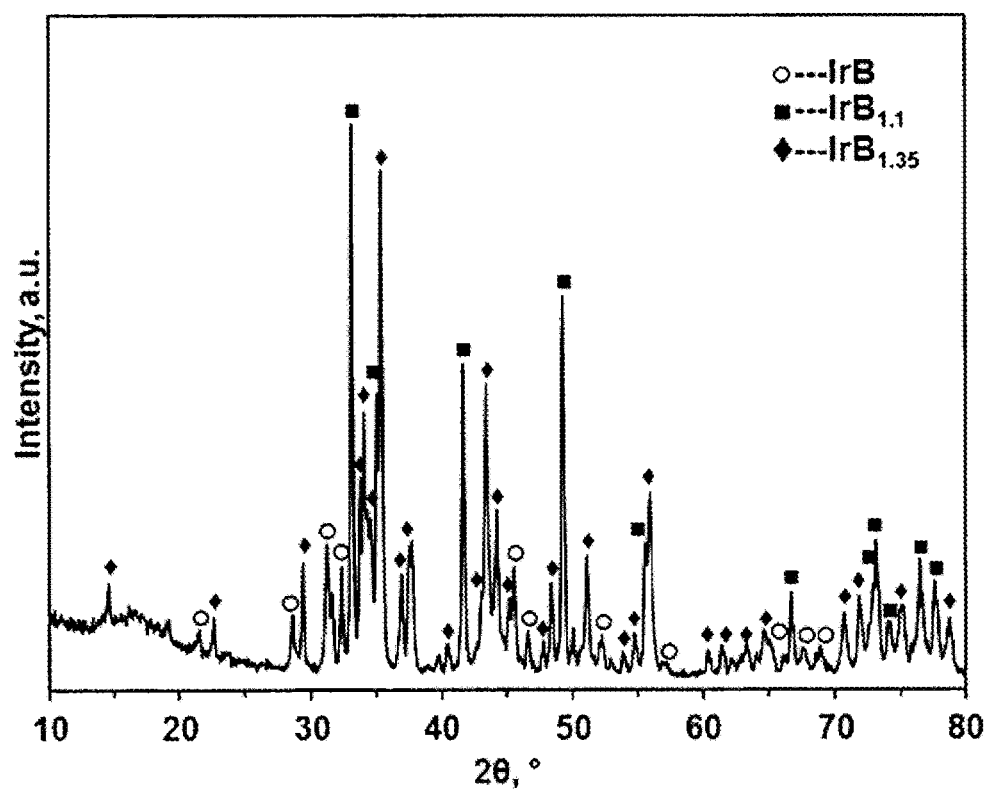
FIG. 10 shows XRD patterns for the iridium and boron powder mixture after 90 hours of ball milling and 72 hours of annealing with a laboratory XRD.

The laboratory XRD pattern of the reaction product after the steps of mechanochemical reaction and annealing is illustrated in FIG. 10. As can be seen in FIG. 10, a mixture of three iridium boride phases is present in the powder after 90 hours of milling and 72 hours of annealing. Along with the $IrB_{1.35}$ and $IrB_{1.1}$ phases, the orthorhombic iridium monoboride structure has also been identified. Rietveld refinement of the XRD pattern showed that the reaction product after 90 hours of milling and 72 hours of annealing consisted of 51.9 wt % of the $IrB_{1.35}$ phase, 34.0 wt % of the $IrB_{1.1}$ phase, and 14.1 wt % of the iridium monoboride phase.

The morphology and particle size of the powders were examined in a MERLIN SEM available from Zeiss (Oberkochen, Germany) equipped with a silicon drift energy dispersive X-ray spectroscopy (EDS) detector capable of detecting low Z elements such as boron.

Figure 11:
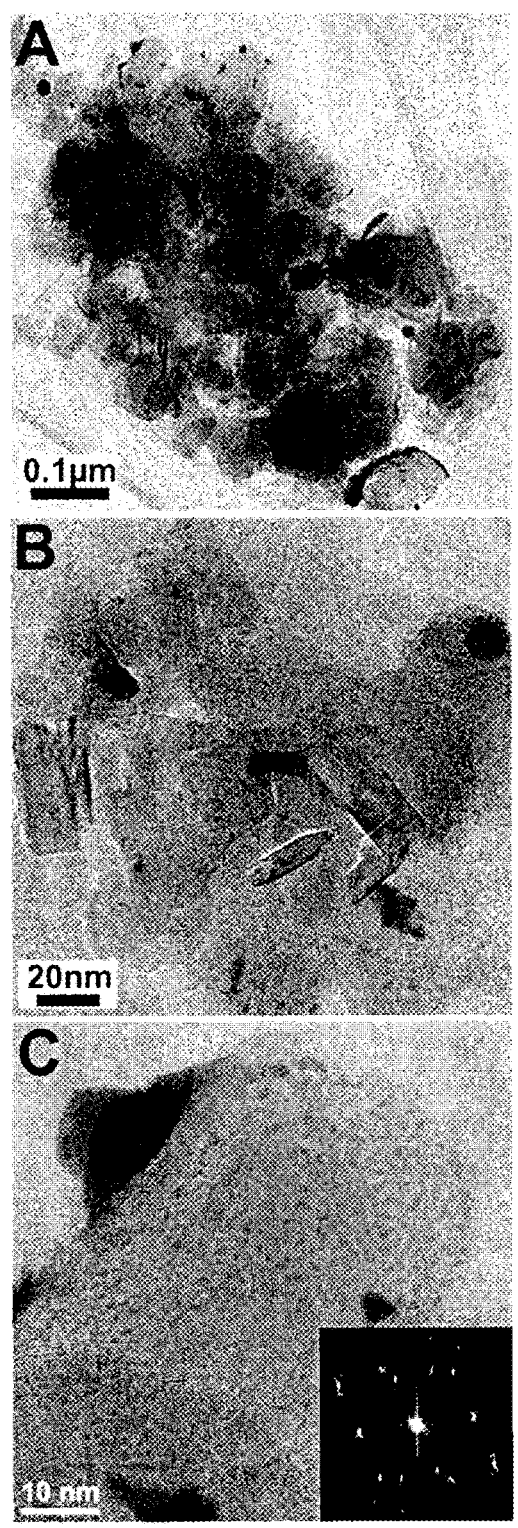
FIG. 11 shows STEM images of the iridium and boron mixture after 90 hours of ball milling and 72 hours of annealing.

After the annealing the mechanochemically reacted iridium and boron powders for 72 hours, the average crystallite size of the powder was 60.7±18.2 nm as measured using the STEM images illustrated in panels A-C of FIG. 11 obtained by the JEM2200FS aberration-corrected high-resolution scanning transmission electron microscope (HRSTEM) available from Jeol, Ltd.

Figure 12:
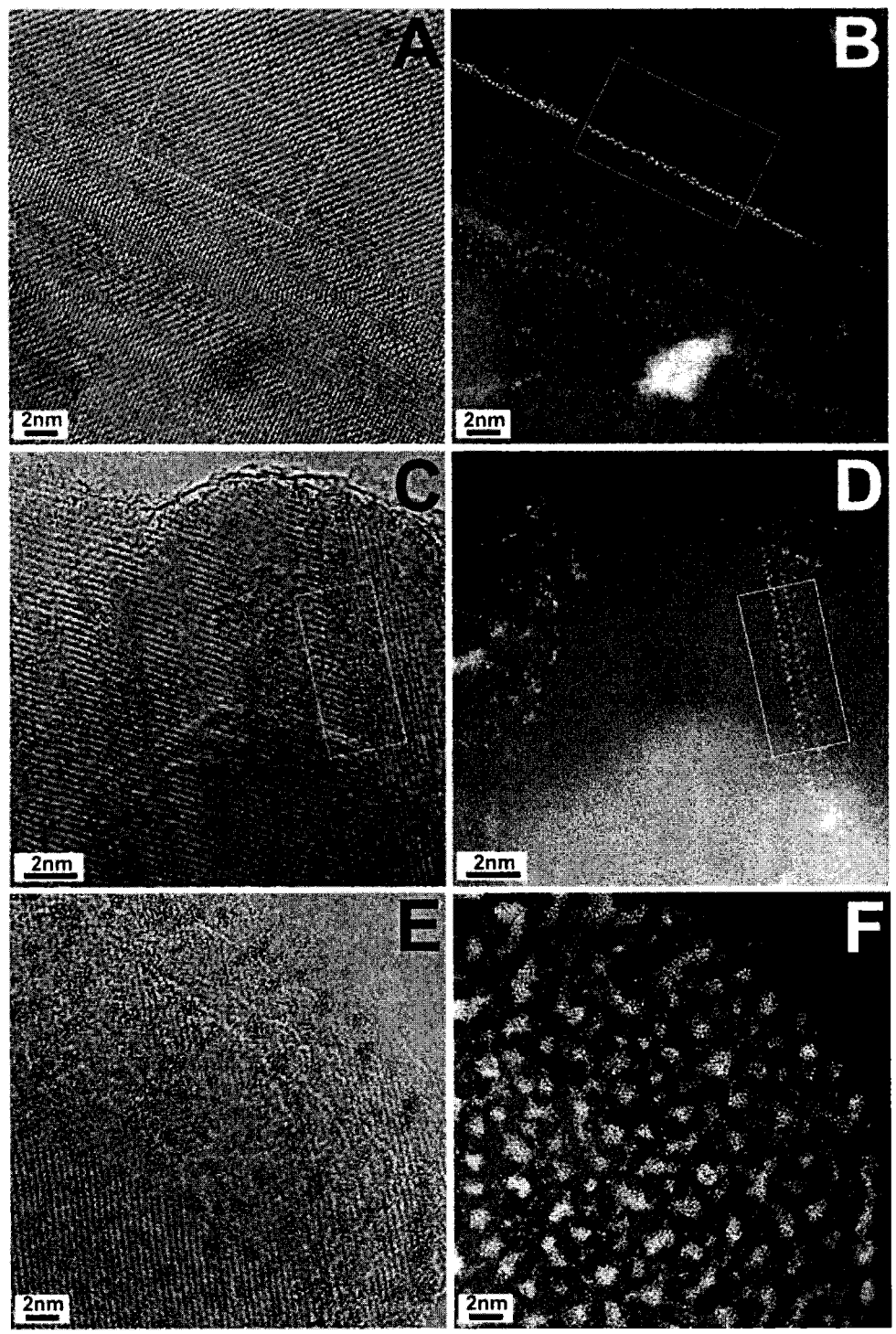
FIG. 12 shows STEM images of the iridium and boron mixture after 90 hours of ball milling and 72 hours of annealing.
Figure 13:
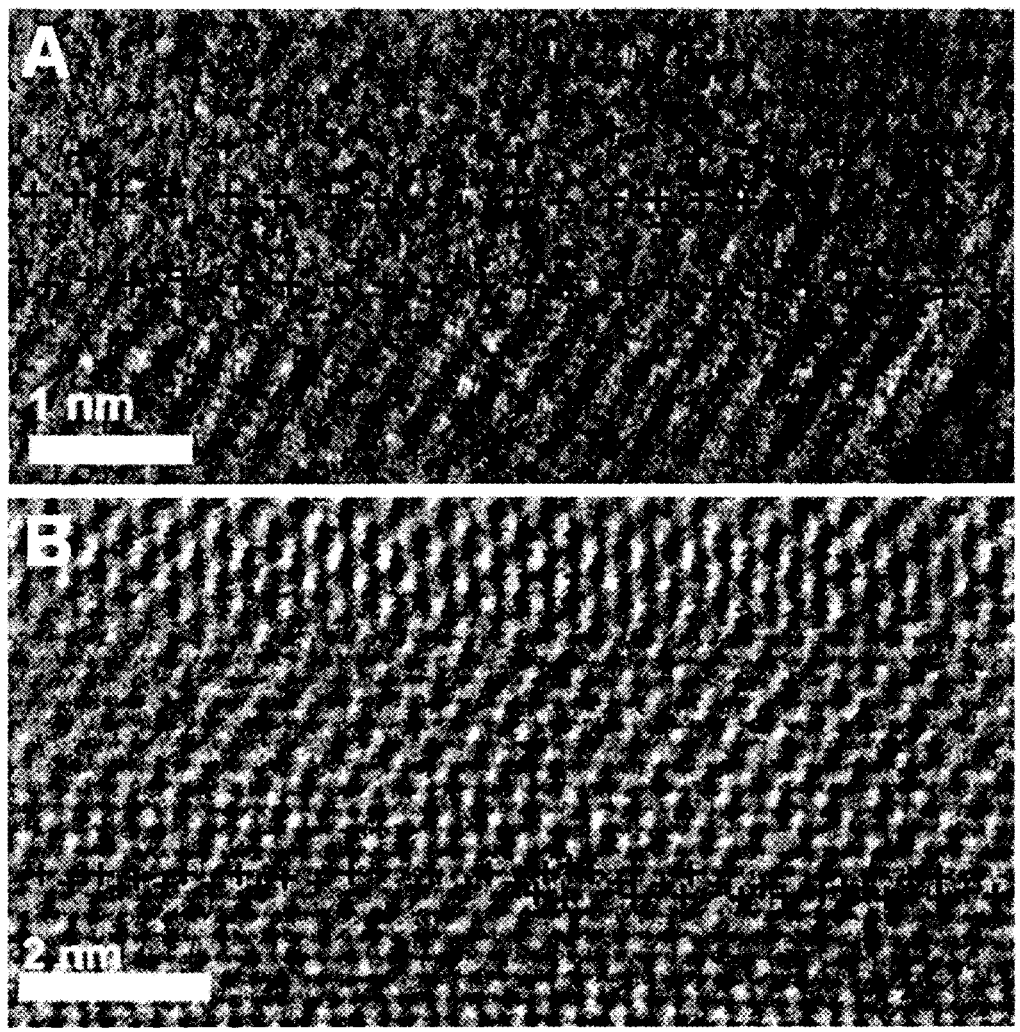
FIG. 13 shows STEM images of iridium atom sites within boron lattice fringes.

It was also found that after annealing the mechanochemically reacted iridium and boron powders for 72 hours, a number of iridium atoms appeared to segregate either along the domain boundaries of the particles or in separate rounded clusters as observed in the STEM images illustrated in panels A-D of FIG. 12 also obtained by the JEM2200FS aberration-corrected high-resolution scanning transmission electron microscope (HRSTEM) available from Jeol, Ltd. While the bright field images of the areas of interest showed the appearance of such disordered thin and long areas inside the grains (panels A and C of FIG. 12), the use of Z contrast allowed to confirm the segregation of individual iridium atoms inside of these disordered long stripes (panels B and D of FIG. 12) and determine the precise/exact location of each individual atom as illustrated in FIG. 13.

In addition to such "line" segregation of iridium atoms, metal clustering also occurred as reflected in panels E and F of FIG. 12.

In one non-limiting explanation, it is proposed that the segregation of a portion of the iridium atoms into separate lines or clusters is caused by the reaction of the various iridium boride phases with small quantities of oxygen present in the atmosphere during annealing for 72 hours.

Thus, in accordance with the disclosure, there has been provided a composition comprising at least one of iridium diboride and/or iridium monoboride, as well as methods of producing and using same, that fully satisfy the objectives and advantages set forth herein above. Although the present disclosure has been described in conjunction with the specific language set forth herein above, it is evident that many alternatives, modifications, and variations will be apparent to those skilled in the art. Accordingly, it is intended to embrace all such alternatives, modifications, and variations that fall within the spirit and broad scope of the present disclosure. Changes may be made in the construction and the operation of the various components, elements, and assemblies described herein, as well as in the steps or the sequence of steps of the methods described herein, without departing from the spirit and scope of the present disclosure.

What is claimed is:

1. A composition comprising iridium diboride and iridium monoboride.

2. The composition of claim 1, wherein the iridium diboride has a hexagonal $ReB_2$ structure.

3. The composition of claim 1, wherein the iridium monoboride has an orthorhombic lattice.

4. The composition of claim 1, wherein the composition further comprises a phase of iridium boride comprising $IrB_{1.35}$.

5. The composition of claim 4, wherein (i) the $ReB_2$ iridium diboride is present in the composition at a range of from about 5 to about 10 wt %, (ii) the iridium monoboride is present in the composition at a range of from about 5 to about 20 wt %, and (iii) the $IrB_{1.35}$ phase of iridium boride is present in the composition at a range of from about 70 to 90 wt %.

6. A method of producing the composition of claim 1 comprising:
   mechanochemically reacting iridium and boron, and
   annealing the mechanochemically reacted iridium and boron.

7. The method of claim 6, wherein the iridium and boron are added at a molar ratio in a range of from about 1:2 to about 1:5 iridium to boron.

8. The method of claim 6, wherein the iridium and boron are mechanochemically reacted for at least 30 hours and annealed for a time in a range of from about 12 hours to about 60 hours to produce a composition comprising iridium diboride and iridium monoboride.

9. The method of claim 8, wherein the iridium and boron are mechanochemically reacted for about 30 hours.

10. The method of claim 8, wherein the mechanochemically reacted iridium and boron are annealed for about 48 hours at about 1050° C.

11. The method of claim 6, wherein the iridium and boron are mechanochemically reacted for at least 30 hours and annealed for a time greater than 60 hours to produce a composition comprising iridium monoboride and at least one of (a) one or more rows of single iridium atoms and (b) one or more clusters of iridium atoms.

12. The method of claim 8, wherein the iridium and boron are annealed at a temperature in a range of from about 950° C. to about 1150.

* * * * *

UNITED STATES PATENT AND TRADEMARK OFFICE
CERTIFICATE OF CORRECTION

PATENT NO. : 10,427,946 B2
APPLICATION NO. : 15/522702
DATED : October 1, 2019
INVENTOR(S) : Orlovskaya et al.

It is certified that error appears in the above-identified patent and that said Letters Patent is hereby corrected as shown below:

On the Title Page

Under (73) Assignee: After "University of Central Florida Research Foundation, Inc., Orlando, FL (US)" insert -- ;UT-Battelle, LLC, Oak Ridge, TN (US) --

In the Specification

Column 14, Line 59: Delete "B and 0" and replace with -- B and O --

Signed and Sealed this
Sixth Day of September, 2022

Katherine Kelly Vidal
*Director of the United States Patent and Trademark Office*